Sept. 29, 1931. A. E. STACEY, JR 1,825,103
CONDUIT
Filed March 21, 1929   2 Sheets-Sheet 1

INVENTOR.
Alfred E. Stacey Jr
by Parker & Rochurst.
ATTORNEYS.

Sept. 29, 1931.  A. E. STACEY, JR  1,825,103

CONDUIT

Filed March 21, 1929   2 Sheets-Sheet 2

INVENTOR.
Alfred E. Stacey Jr.
By Parker & Brochuiser
ATTORNEYS.

Patented Sept. 29, 1931

1,825,103

UNITED STATES PATENT OFFICE

ALFRED E. STACEY, JR., OF ESSEX FELLS, NEW JERSEY, ASSIGNOR TO CARRIER ENGINEERING CORPORATION, OF NEWARK, NEW JERSEY

CONDUIT

Application filed March 21, 1929. Serial No. 348,765.

This invention relates to improvements in fluid conducting conduits, such as are extensively used, for example, for air and other gaseous fluids, and to fluid splitters or devices employed in connection with conduits for dividing a moving fluid column into separate streams or currents, or for permitting the union of separate fluid streams or currents. The splitting or merging of fluid columns or currents, such as where a main duct subdivides into a plurality of branch or auxiliary ducts, frequently gives rise to objectionable noises, particularly where the fluid flow through the ducts is quite rapid.

An object of the invention is to provide an improved conduit in which fluid currents are divided or united, with which noises caused by fluids passing therethrough will be practically or entirely eliminated regardless of the velocity of fluid flow therethrough; with which resistance to fluid flow there through will be reduced to a minimum; and which will be relatively simple and inexpensive.

A further object of the invention is to provide improved conduit in which fluid currents are divided or united, with which the relative distribution of the fluid flow between the different branch or auxiliary ducts may be selectively varied; which will be practically noiseless regardless of the relative distribution of fluid flow through the branch ducts; and which will offer a minimum of resistance to fluid flow through all variations of the relative distribution of fluid flow in the branch ducts.

Various other objects and advantages will be apparent from the following description of several embodiments of the invention, and the novel features will be particularly pointed out hereinafter in connection with the appended claims.

Figure 1:
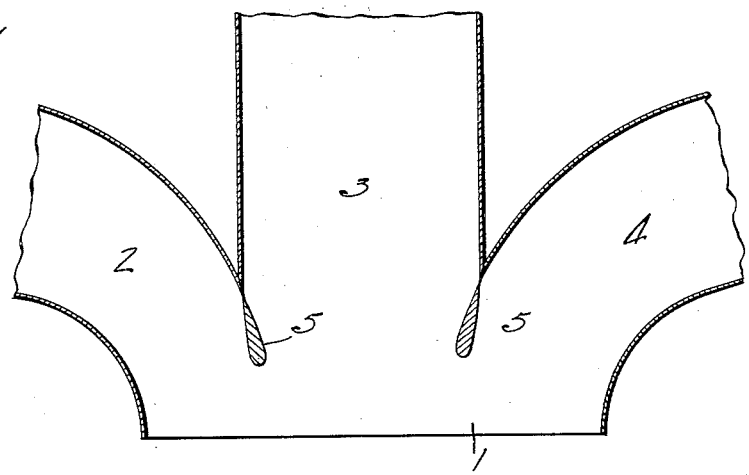
Fig. 1 is a sectional plan through a portion of a conduit constructed in accordance with this invention, and illustrating one embodiment of the invention.
Figure 2:
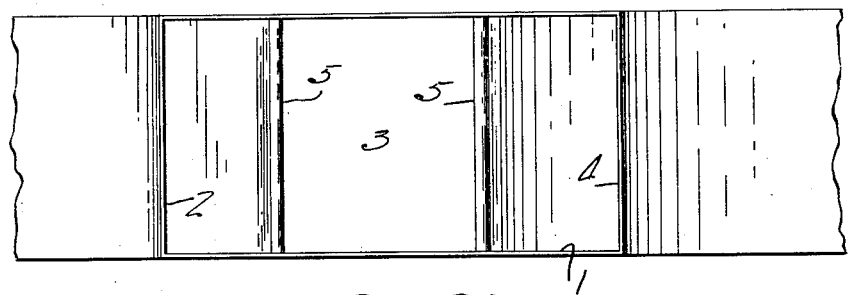
Fig. 2 is a front elevation of the conduit shown in Fig. 1.

In the embodiment of the invention illustrated in Figs. 1 and 2, the conduit includes a main duct 1 which at one end subdivides into a plurality of branch ducts 2, 3, and 4, the branch duct 3 continuing in approximately the same direction, and the other branch ducts 2 and 4 curving away from the duct 3.

A splitter wall 5 is disposed along each junction edge between the intersecting branch or auxiliary ducts 2, 3 and 4, so as to extend somewhat into the main duct, and these splitter walls 5 are made of stream line configuration in transverse cross section, with the tapered rear edge of each merging into and forming an extension of, the junction edge between intersecting branch or auxiliary ducts. The ducts are all preferably, as usual, of rectangular cross section, and the particular stream line shape for the splitter walls 5 is selected with respect to the direction and velocity of fluid flow through the ducts.

Figure 3:
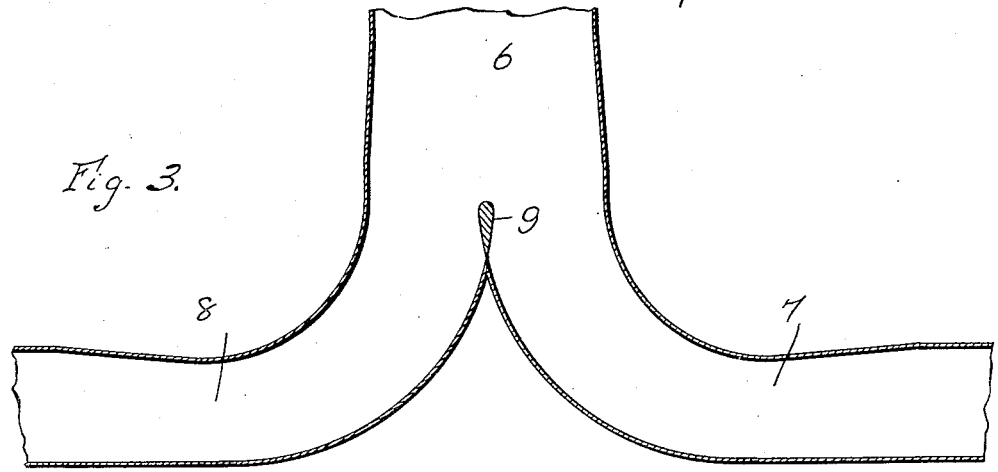
Fig. 3 is a sectional plan of another conduit also constructed in accordance with the invention but illustrating another embodiment thereof.

In Fig. 3 another embodiment of the invention is illustrated, in which the main duct 6 subdivides into auxiliary or branch ducts 7 and 8, the main duct 6 being slightly enlarged just prior to the junction between the branch ducts 7 and 8. The junction edge between the branch ducts 7 and 8 is provided with a stream line splitter wall or strip 9, whose stream line shape is selected with respect to the direction and velocity of fluid flow through the conduits.

Figure 4:
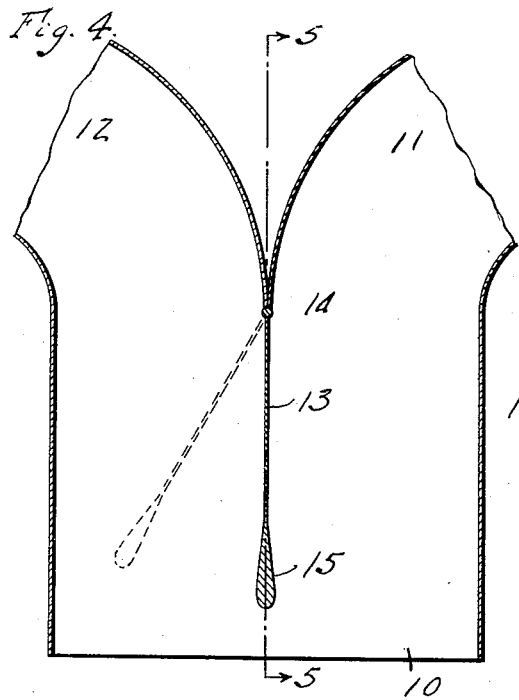
Fig. 4 is a sectional elevation through a portion of another conduit also constructed in accordance with the invention, and illustrating the use therein of an adjustable splitter vane or damper for variably proportioning the relative flow in the branch ducts.
Figure 5:
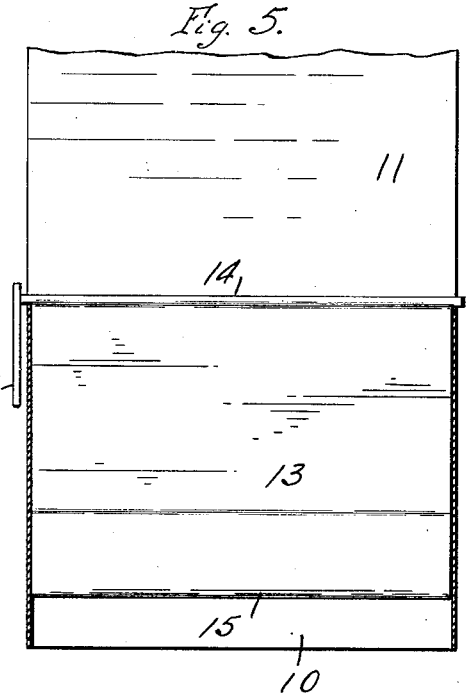
Fig. 5 is a sectional elevation through the same, the section being taken approximately along the line 5—5 of Fig. 4.
Figure 6:
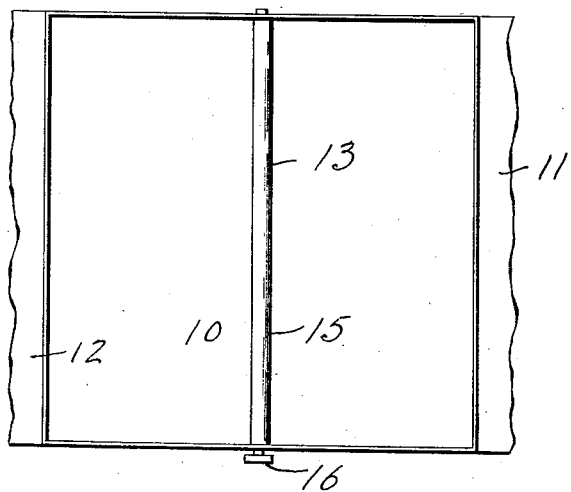
Fig. 6 is an end elevation of a portion of the conduit shown in Fig. 4.

In the embodiment of the invention illustrated in Figs. 4 to 6, the main duct 10 subdivides into auxiliary or branch ducts 11 and 12, and at the junction between the branch ducts a splitter wall, vane or damper 13 is mounted. This vane or damper 13 may be attached to a pivot rod 14 extending along the junction edge between the branch or auxiliary ducts 11 and 12 and pivotally mounted in the walls of the ducts, so that the vane or damper may be pivotally adjusted laterally so as to vary the relative proportions or distribution of fluid passing into branch or auxiliary ducts 11 and 12 from the main duct 10.

The vane or damper 13 may comprise a relatively thin plate-like section extending from the pivot rod 14 and along the free edge opposite the pivot rod 14 may be reinforced, thickened or stiffened in any suitable manner, such as at 15.

This reinforcing section along the leading or free edge opposite the pivot 14 is made of stream line configuration in transverse cross section, as shown clearly in Fig. 4. This reinforcement of the forward or leading edge of the splitter or damper prevents vibration or fluttering of the damper or vane.

Figure 7:
Fig. 7 is a diagram illustrating, on a larger scale, one stream line shape which may be given the splitter in any of the embodiments illustrated in Figs. 1 to 6.

The pivot rod 14 may extend outside of the conduit, and carry any suitable device 16 exteriorly of the conduit by which the splitting vane or damper 13 may be adjusted from side to side as may be required or desired. One form of stream line shape suitable for such dampers or splitting edges is shown diagrammatically in Fig. 7, and represents a very satisfactory shape for the splitting walls or edges of the construction of Figs. 1 to 6.

Conduits such as are extensively used for ventilating and air conditioning systems are commonly formed of thin sheet metal, and are usually rectangular in cross section. With very low velocities of fluid flow through such conduits, little difficulty has been experienced with noises in the conduits. Where the velocities were increased, however, considerable difficulty has been experienced from noises in the conduits, the noises being carried through the conduits throughout the buildings and therefore were highly objectionable. While the exact causes of such noises are not positively known, I have found that by utilizing a splitter edge or wall of stream line shape, the noises which have been previously in existence in such conduit systems have been practically or entirely eliminated.

It is believed that such noises largely result from fluid eddies or low pressure areas which are brought about by the introduction of a relatively fixed object into the fluid flow. The tendency of a splitting wall to flutter is increased whenever there is an unbalanced condition at the division of the ducts but when the splitting or leading edge of either a fixed or adjustable splitter is made of stream line configuration, I have found that there is a considerably less tendency for it to vibrate or flutter.

An exactly balanced condition at the division of the ducts is seldom if ever obtained, and the reinforcement angles previously provided on the splitting or leading edges created a series of eddies which resulted in noises, vibration and fluttering of the splitters.

If a current of air or fluid is split suddenly by an interposed object, even by the thin edge of a plate, small eddies are formed flowing around the splitting object or plate, and these eddies apparently pile up and increase the low pressure areas caused by the eddying of the fluid, and create a noise. With the introduction of the stream line splitter, these low pressure eddies or areas are practically entirely avoided, and therefore noises resulting directly or indirectly from the low pressure areas or eddies are largely or entirely eliminated.

It will be obvious that various changes in the details, which have been herein described and illustrated in order to explain the nature of the invention, may be made by those skilled in the art within the principle and scope of the invention as expressed in the appended claims.

I claim as my invention:

1. An improved conduit construction comprising a main duct sub-dividing into a plurality of separate auxiliary ducts, the wall forming each junction edge between auxiliary ducts having a convex free edge and a thickness tapering to a minimum towards the opposite edge whereby said junction edge will have a stream line configuration with respect to the direction of fluid flow through said main duct.

2. An improved conduit construction comprising a main duct sub-dividing into a plurality of branch ducts, and a wall extending into said main duct from the common junction edge of said branch ducts, said wall in transverse cross section having a convex leading edge whose curvature increases in radius in a direction toward the opposite edge and which merges into sides which converge in a direction away from the convex edge whereby said wall will be of stream line configuration with respect to the direction of fluid flow through said main duct.

3. An improved conduit construction comprising a main duct sub-dividing into a plurality of branch ducts, a damper hinged in said conduit upon an axis approximately along the junction edge between said branch ducts and swingable from side to side to vary the relative proportions of fluid flow in said branch ducts, the free edge portion of said damper at the side opposite the hinged edge being convex and the sides of said damper converging from the convex edge toward the hinged edge, whereby said damper will be of stream line configuration with respect to the direction of fluid flow in said main duct.

4. An improved conduit construction comprising a main duct sub-dividing into a plurality of diverging branch ducts, a damper hinged in said conduit upon an axis approximately along the junction edge between said branch ducts and swingable from side to side to vary the relative proportions of fluid flow in said branch ducts, the free edge portion of said damper at the side opposite the hinged edge in transverse cross section being convex, and said damper having a thickness decreasing from the convex edge towards said hinged edge whereby said damper will be of stream line configuration with respect to the direction of fluid flow in said main duct.

5. An improved conduit construction comprising a main duct sub-dividing into a plurality of diverging branch ducts, a fluid splitting wall extending into the main duct from the junction edge between the branch ducts and having a convex leading edge and sides converging away from said leading edge.

6. An improved conduit construction for ventilating and air conditioning systems and the like comprising a pair of branch ducts meeting at an oblique angle to one another and merging into a common duct, and a projecting wall extending into said common duct from the common junction edge between the branch ducts and having a convex free edge and a thickness tapering toward a minimum at said junction edge whereby fluttering of the splitting edge is avoided.

7. An improved conduit construction for ventilating and air conditioning systems and the like comprising a pair of branch ducts meeting at an oblique angle to one another and merging into a common duct, and a projecting wall extending into said common duct from the common junction edge between the branch ducts, said wall having a convex free edge and a thickness tapering toward a minimum at said junction edge thereby providing a stream line shape with respect to the direction of fluid flow from the common duct into the branch ducts, whereby fluttering of the splitting edge is avoided, the leading edge of said wall being swingable laterally to vary the proportions of the stream divided thereby.

8. A ventilating and air conditioning system or the like having a common duct sub-dividing into a plurality of branch ducts, the junction edge between the branch ducts being convex at its free edge and tapering to a minimum thickness toward the junction edge between the branch ducts; whereby said junction edge will be stream line in configuration with respect to the direction of fluid flow in said main duct.

9. In ventilating and air conditioning systems and the like, the improved method of handling the air currents which comprises interposing a relatively thin splitter wall with convex leading edge and rearwardly tapering thickness in a main stream to split the main stream and separate it into a plurality of smaller streams of any desired proportions, and conducting the divided streams in diverging separate paths.

10. In ventilating and air conditioning systems and the like, the improved method of handling the air currents which comprises interposing a relatively thin splitter wall with convex leading edge and rearwardly tapering thickness in a main stream to split the main stream and separate it into a plurality of smaller streams of any desired proportions, and varying the position of said object in said stream to vary the proportions of the smaller streams into which the main stream is divided.

ALFRED E. STACEY, Jr.